United States Patent [19]
Munzinger

[11] 3,853,014
[45] Dec. 10, 1974

[54] IMPROVEMENT IN THE TRANSMISSION MECHANISM OF AN OSCILLATING ENGINE

[76] Inventor: Friedrich Munzinger, Hohenrandstrasse 46, 7 Stuttgart 80, Germany

[22] Filed: Mar. 7, 1973

[21] Appl. No.: 338,652

[52] U.S. Cl. ............................ 74/70, 74/36, 92/120, 417/481
[51] Int. Cl. ............................................ F16h 21/40
[58] Field of Search .............. 74/63, 40, 43, 51, 36, 74/96, 70; 308/3 CH; 417/481; 92/120; 123/18 R

[56] References Cited
UNITED STATES PATENTS
248,524  10/1881  Stevens .................................. 92/120
1,496,959  6/1924  Weaver ................................... 74/36

Primary Examiner—Wesley S. Ratliff, Jr.
Attorney, Agent, or Firm—Mason, Kolehmainen, Rathburn & Wyss

[57] ABSTRACT

The invention described relates to the provision of a transmission mechanism between the piston and the crankshaft of an oscillating engine of the kind in which the piston oscillates in a cylinder and it resides in arrangements including intermediate pivotally connected elements which so control the relative one of the two phase positions of the crankshaft and piston as to ensure that crankshaft dead-centres corresponds with the mid-stroke position of the piston.

7 Claims, 4 Drawing Figures

IMPROVEMENT IN THE TRANSMISSION MECHANISM OF AN OSCILLATING ENGINE

BRIEF DESCRIPTION OF THE PRIOR ART

In every large mass of earlier suggestions for the construction of machines - usually internal combustion motors - of the arcuate-oscillating piston type, that of a French patent is the closest known to the Applicant herein. In this, in transmission mechanism known from French Pat. No. 914,008 the two cranks of the piston shaft and crank-shaft are inter-connected via a single connecting rod. Shortly before and shortly after the swingthrough median position (half-stroke) of the piston, there arises in that case an asymptotic power increase which requires excessive design dimensions of the transmission mechanism. Moreover the known arrangement involves adherence to close manufacturing tolerances between crankshaft dead-centre and half-stroke position of the piston, and to a comparatively low peak output power attributable mainly to the connecting rods inability to transmit power at that instant.

The invention is concerned with transmission mechanism for an oscillating engine (i.e., heat engine or compressor) having at least one piston which is connected to a piston shaft, the reversal points of the piston being separated, in the arc of oscillation, by an angle in excess of 180° and where the transmission mechanism preferably has a fully rotating crankshaft with its axis parallel to that of the piston shaft, these two shafts being interconnected via a crank and a connecting-rod.

In transmission mechanism know from French Pat. No. 914008 the two cranks of the piston shaft and crankshaft are interconnected via a single connecting rod. Shortly before and shortly after the swing-through median position (half-stroke) of the piston, there arises in that case an asymptotic power increase which requires excessive design dimensions of the transmission mechanism. Moreover the known arrangement involves adherence to close manufacturing tolerances between crankshaft dead centre and half-stroke position of the piston, and to a comparatively low peak output power attributable mainly to the connecting rod's inability to transmit power at that instant.

For simplicity, reference is made herein to a "cylinder"; strictly this does not refer to a shape which is a volume of revolution of uniform radius about a straight axis, but to a chamber formed about an arcuate axis which functionally operates in the manner of a cylinder in reciprocating engine. Moreover, the word "piston" is used herein to mean the sliding element which displaces or is displaced by the working fluid in such cylinder, although this may well be more in the nature of a vane working in an arcuate chamber than an ordinary piston.

An aim therefore, is to provide linkage for an arcuately oscillating engine having a considerable arc of operation, which may be built with comparatively small dimensions and which is independent of close manufacturing tolerances, and which is capable of achieving a comparably higher peak output power. A machine according to the invention is completely reversible in sense of direction of its output (or input) drive.

BRIEF SUMMARY OF THE INVENTION

This aim is achieved by the invention, in that both the piston shaft and the crankshaft are each hinged to a rocking lever or bellcrank via a respective connecting rod being each hinged to the respective crank of the two shafts, and that the hinge points of the connecting rods are so arranged that the one crankshaft dead centre is coincident with the half-stroke or median position of the piston. In this way there is provided transmission mechanism in which practically no forces come to act upon the piston when the same is at its median position, and in which problems concerning the swing-through of the crankshaft when it goes through its dead centre are alleviated. The invention, further, permits a very long stroke of the piston limited only by design considerations to approx. 300° of arc of oscillation, very large stroke values and correspondingly high working revolutions of the crank shaft are admissible, so that a high peak output power is readily achievable.

BRIEF DESCRIPTION OF THE DRAWINGS

Advantageous further elaboration of the transmission mechanism in accordance with the invention evolves from the following descriptions of some practical examples represented schematically in the accompanying drawings in which.

DESCRIPTION OF THE PREFERRED EMBODIMENTS

Figure 1:
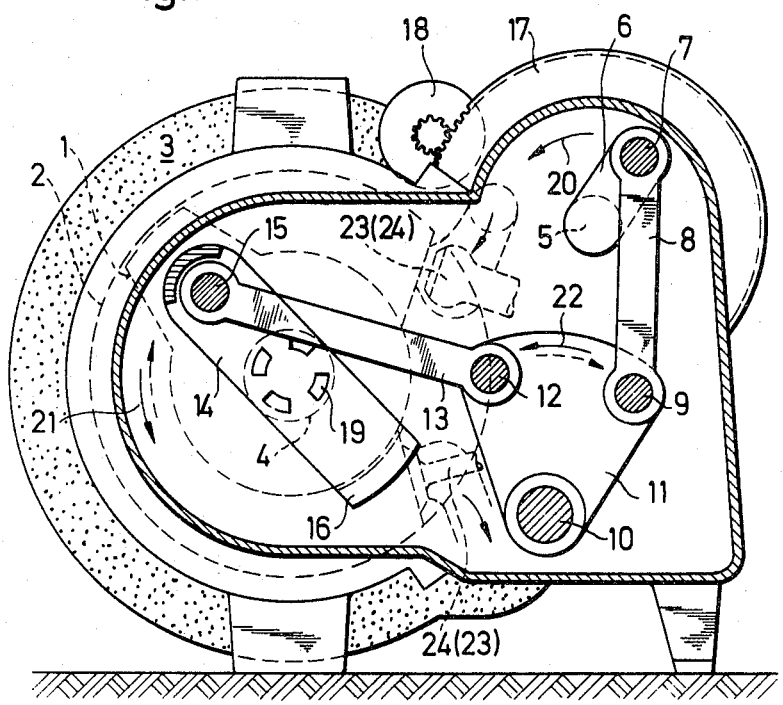
FIG. 1 shows a sectional representation of a first form of transmission mechanism.

In FIG. 1 there appears the piston 1 of an oscillating engine whose operating (so-called, but in fact arcuately formed) cylinder 2 can be provided with an insulation jacket 3 if the machine is a heat engine. When it is working as a compressor, then a cooling jacket replaces the insulation 3. Piston 1 is rigidly mounted on a piston shaft 4 parallel to which a rotating crankshaft 5 of the transmission mechanism is positioned. Crank 6 of crankshaft 5 has a connecting rod 8 rotatably borne at 7. Connecting rod 8 is connected at its other end pivotally at 9 to a rocking lever or bellcrank 11 which rocks on a journal on a shaft 10 and to which at 12 a further connecting rod 13 is journalled. Connecting rod 13 has a hinged connection at 15 to a crank 14 of the piston shaft 4. The crank 14 is preferably made in one piece with a balance weight 16.

A flywheel 17 is provided on the crankshaft 5, and cooperates with a starter motor 18. The effect of this starter is preferably aided and/or substituted by a further starter (not shown) cooperating with the piston shaft 4, for which purpose coupling dogs 19 may be provided, rigidly connected to the shaft 4. This further starter (not shown), which may also be coupled directly to the piston shaft during the course of starting up, may be used to accelerate the piston 1 to the speed necessary for swinging through its dead centre.

In the course of starting up, crankshaft 5 and piston shaft 4 are rotated, for example in an anti-clockwise direction as indicated by directional arrows 20 and 21. Their rotations are synchronously coupled via crank 6, connecting rod 8, rocking lever 11, connecting rod 13 and crank 14, so that in this first starting phase rocking lever 11 is likewise rotated in an anti-clockwise sense as indicated by arrow 22. Partial rotation of the piston shaft 4 results in the piston 1 being moved towards one of its end-of-stroke reversal points. At both reversal points of piston 1, which in the example of FIG. 1 are shown at approx. 250° apart in terms of the arcuate stroke of the piston, there are situated valves 23 and 24 for inlet and exhaust of the working fluid - the directional flow of which inside their respective flow ducts, is indicated by corresponding flow arrows.

When the engine is constituted as a heat engine, for example as a hot gas engine, then the working gas is admitted under pressure to the cylinder 2 in the region of the upper reversal point of piston 1 through the valve 23 and whilst expanding, moves the piston 1 in an anticlockwise direction. The piston 1 then pushes the working medium which has expanded during the preceding stroke out, through the valve 24 situated in the region of the lower reversal point. When working as a compressor, the piston, moving anti-clockwise, would compress the working medium expanded during the preceding stroke, and then would push it out through valve 24.

Figure 2:
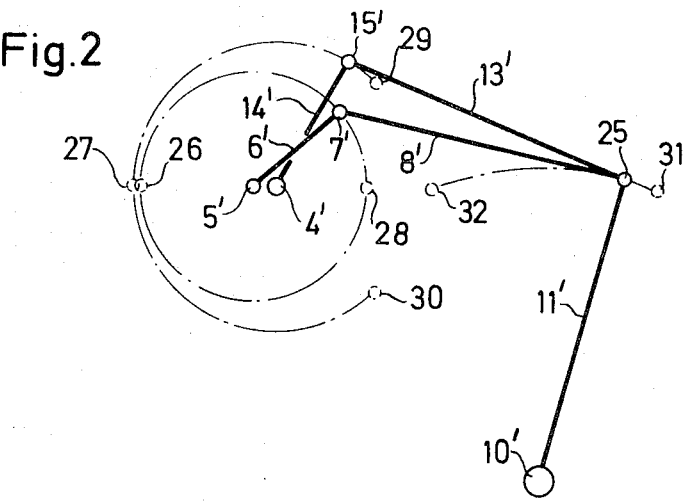
FIG. 2 shows a diagrammatic representation of a slightly modified execution of the transmission mechanism of FIG. 1, FIG. 3 again shows schematically a further execution of the transmission mechanism in one elevation.

In the modified example in accordance with FIG. 2 essentially the same conditions apply. In contrast to the FIG. 1 example, crankshaft connecting rod 8' and piston shaft connecting rod 13' are each hinged connected at a common hinge point, at 25 on the rocking lever 11'.

The hinge point 25 is so positioned in relation to the hinge points 7' and 15' respectively of the two connecting rods 8' and 13', that the one crankshaft dead centre 26 coincides with the intermediate dead center 27 of the piston. By this arrangement difficulties in respect of swing-through are largely eliminated where the critical dead centre 26 of the crankshaft is concerned, because the momentum the piston at one or the other of its end-of-stroke reversal points, is made use of in overcoming the crankshaft's dead centre. This desirable effect may be increased by designing the piston to be of a particular mass probably greater than it needs to be for other reasons, or by providing additional mass in some other way in order to afford the required dynamic effect. The other dead centre 28 of crankshaft 4' in comparison is less of a problem because in this case the piston alternately assumes one or the other of its reversal points 29 and 30. At these piston reversal points 29, 30 the hinge point 25 of the two connecting rods 8' and 13' is either at 31 or 32 respectively.

Figure 3:
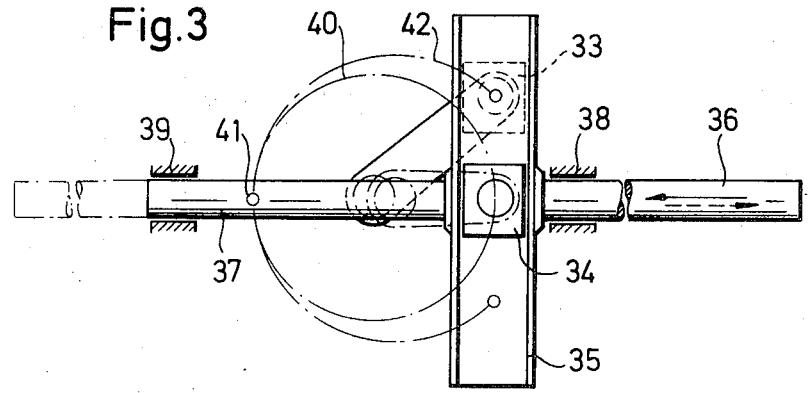
Figure 4:
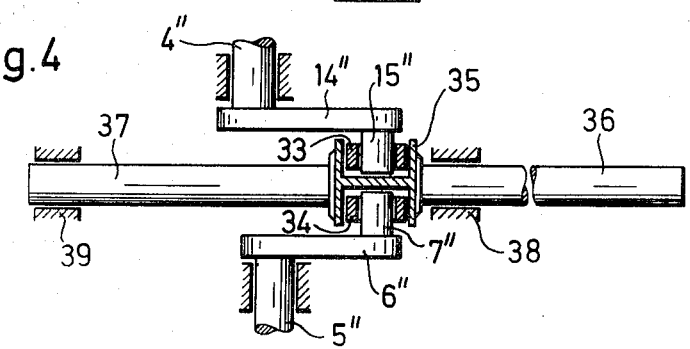
FIG. 4 shows the transmission mechanism of FIG. 3 in a second elevation.

In the transmission mechanism illustrated by FIGS. 3 and 4, the rocking lever 11, 11' of FIGS. 1 and 2 with their associated connecting rods are replaced with a crosshead slide. In this example, the crankshaft crank 6'' is equipped with a crankpin 7'' and the piston crank 14'' with a crankpin 15''. The crankpins 15'' and 7'' respectively support a crosshead 33 and 34 which are housed and slide linearly in the crosshead slide 35 which is mounted on rods 36 and 37 which in turn slide in linear bearings 38 and 39. The crosshead 34 is borne on crankpin 7'' and when the crankshaft 5'' is rotated, moves along the crankshaft circle 40 and has one of its dead centres 41 lying in the longitudinal axis of the rods 36 and 37. The dead centre 41 is also the dead centre of the other crosshead 33 moving along path 42. In FIG. 3 the two circles 40 and 42 coincide at 41, because the crankpins 7'' and 15'' are coaxial and because the axes of piston shaft 4 and crankshaft 5 are parallel to one another. If in this execution, one arranges the crankshaft 5'' coaxially with the piston shaft 4'' (such an arrangement would incidentally also be feasible in the two earlier examples described) then the axes of the crankpins 7'' and 15'' will be spaced by a corresponding amount (as indicated in FIGS. 3 and 4) in order that the crossheads 33, 34 when in the centre of the guide 35 (that is, located on the longitudinal axis of rods 36 and 37) are simultaneously at the dead centre point 41. It is not essential that the circles 40 and 42 are tangential over it; indeed, an arrangement is possible whereby analogously to the presentation in FIG. 2 one of the crankshaft dead centres is spaced in phase from the intermediate dead center of the piston, in the centre of the guide.

For the two examples in accordance with FIG. 2 and 3, 4 it is considered expedient to assign a starter to each shaft. All examples are suitable for multicylinder operation. In the cases of two or three cylinder engines, these should operate with a phase difference of 180° or 120° respectively. In the interest of achieving good expansion efficiency it is desirable to space the two piston reversal points by as wide an angle of arc of oscillation as possible, limited only by design considerations namely from approx. 240° to approx. 330°. Should the design in question give rise to asymptotically increasing forces in the course of oscillation these may be dealt with by the addition of force limiting means such as spring loaded auxiliary devices, fitted to the connecting rod. In addition provision can be made so that at least one end of each connecting rod is rendered capable of eccentric motion; the eccentricity may be variable.

I claim:

1. An oscillating engine of the kind having a piston oscillating in a cylinder, the piston being connected to a piston shaft which rocks coaxially with the piston over an angular range of between 180° and 360°, said machine also having a crankshaft mounted with its axis parallel to that of the piston shaft in which are provided:

a piston crank rocking with the piston shaft,
a piston connecting rod hingedly connected to the piston crank,
a lever element to which said piston connecting rod is hinged,
a bearing supporting said lever element on a fulcrum axis spaced from the hinge point of said piston connecting rod,
a crankpin on said crankshaft,
a crankshaft connecting rod hinged at one end to said crankpin and at its other end to said lever element at an axis spaced from the fulcrum axis,
the phase relationship of the piston, the lever element and the crankshaft being such that the mid-point of the piston in its arc of oscillation corresponds with one dead-centre position of the piston crank and also with one dead-centre position of the crankshaft.

2. An oscillating engine of the kind having a piston oscillating in a cylinder, the piston being connected to a piston shaft which rocks coaxially with the piston over an angular range of between 180 and 360 degrees, said machine also having a crankshaft mounted with its axis parallel to that of the piston shaft, in which are provided:

a piston crosshead and a crankshaft crosshead pivotally carried on crankpins of the piston shaft and crankshaft, crosshead guide means in which said crossheads slide, support means for said crosshead guide means and permitting sliding of said crosshead guide means in a direction normal to that in which the crossheads slide, a piston crankpin pivotally engaging the piston crosshead, a crankshaft crankpin pivotally engaging the crankshaft crosshead, the crankpins being mounted on cranks of respectively different effective radius, and the arrangement being such that the two crossheads have a common dead-centre on the guide axis.

3. A engine according to claim 1 in which valve means are provided for fluid inlet to and outlet from the cylinder in the region of the stroke-ends of the piston.

4. A engine according to claim 1 further provided with rotor means whereby the crankshaft may be rotated by external power and the piston shaft may be rotated through at least part of the operational cycle of the piston simultaneously with at least initiation of crankshaft rotation.

5. A engine according to claim 1 in which said piston connecting rod and said crankshaft connecting rod are pivotally jointed to said lever element by joints radially spaced from the fulcrum axis of the lever element.

6. A machine according to claim 2 in which the crankpins are attached to their respective shafts at different radii and the two shafts have their axes offset by a dimension equal to such difference.

7. An oscillating engine that includes an arcuate cylinder, a piston pivotably mounted to rotate within said cylinder over an angular range that may approach 360°, and a crankshaft mounted for continuous rotation and having a rotational axis parallel to the rotational axis of said piston, said engine including a system for transmitting energy between said piston and said crankshaft which system comprises:

a piston crank attached to and arranged to rotate with said piston;

a lever element pivotally mounted for rotation about a fulcrum axis that is parallel to and fixed in position relative to both said piston axis and also said crankshaft axis;

a piston connecting rod having first and second ends pivotally attached at its first end to said piston crank at an off-axis point and pivotally attached at its second end to said lever at an off-axis point, the length of said connecting rod and the location of said pivot points being such that a first dead-centre of the piston corresponds to the mid-point of the piston's range of rotational travel, and also such that said lever itself never reaches a dead-centre point; and a crankshaft connecting rod having first and second ends attached at its first end to said crankshaft at an off-axis point and at its second end to said lever at an off-axis point, the length of said crankshaft connecting rod and the location of said pivot points being such that a first dead-centre of the crankshaft coincides with said first dead-centre of said piston, also being such that a second dead centre of the crankshaft coincides with the two end points of the piston's range of rotational travel, and also being such that said lever itself never reaches a dead-centre point;

whereby a smooth, oscillatory rotation of the piston through its first dead-centre point is achieved, and whereby piston rotational angles approaching 360° may be achieved.

* * * * *